C. MANSHEL.
CHECK STAMPING AND ISSUING MACHINE.
APPLICATION FILED MAR. 21, 1919.
1,393,232.
Patented Oct. 11, 1921.
3 SHEETS—SHEET 1.
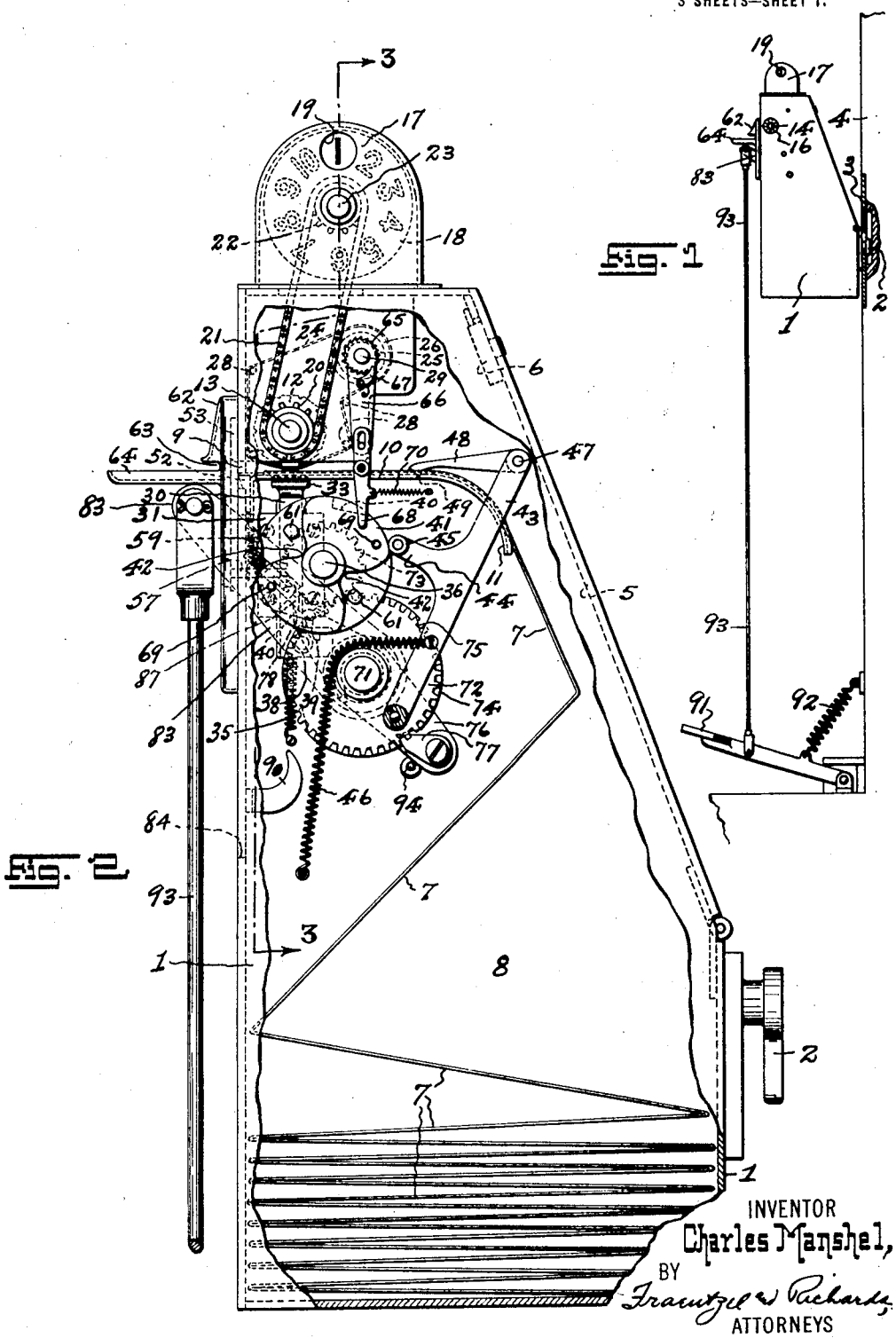
INVENTOR
Charles Manshel,
BY
Frantzel & Richards
ATTORNEYS

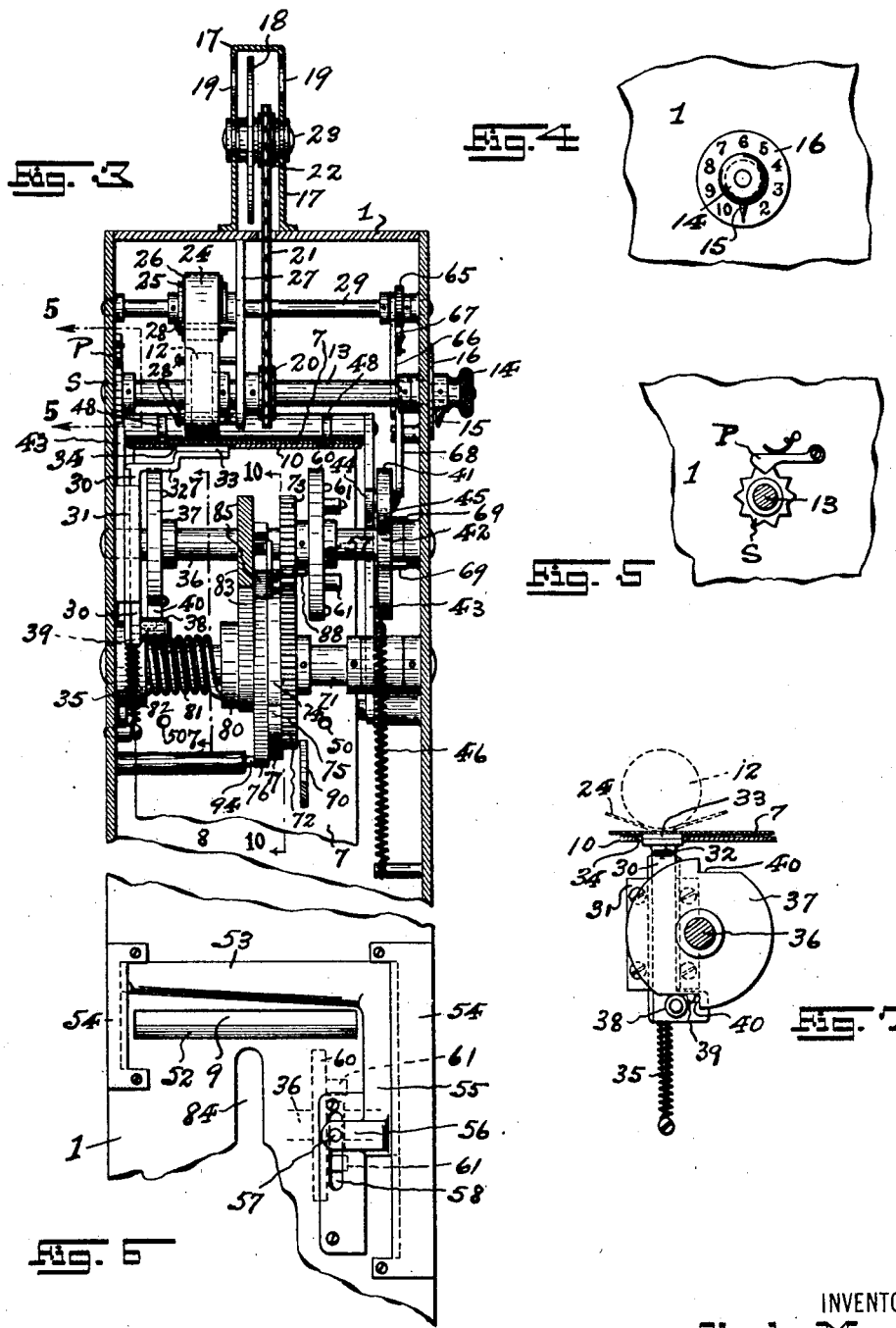

C. MANSHEL.
CHECK STAMPING AND ISSUING MACHINE.
APPLICATION FILED MAR. 21, 1919.
1,393,232.
Patented Oct. 11, 1921.
3 SHEETS—SHEET 3.
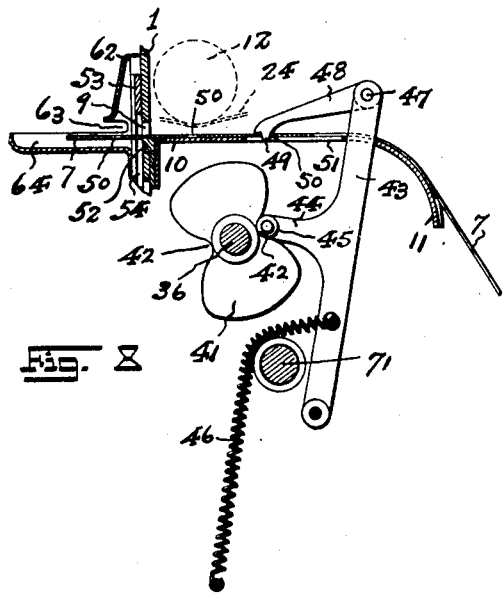
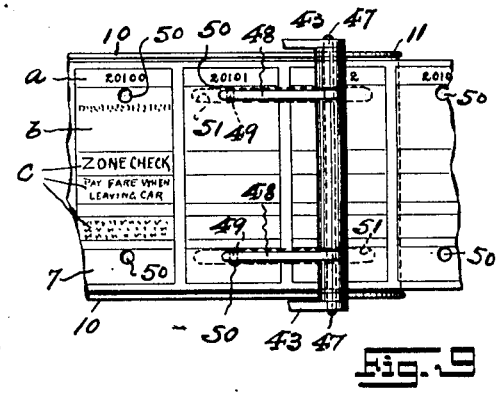
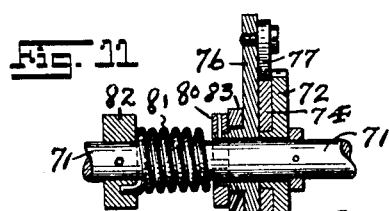
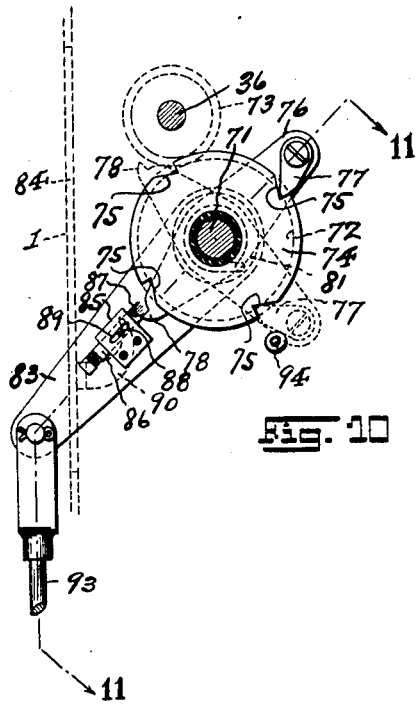
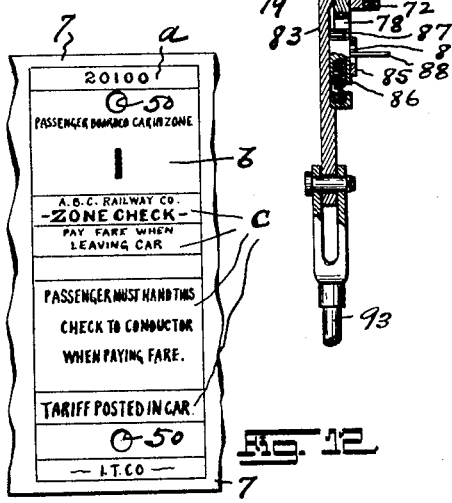
INVENTOR
Charles Manshel,
BY
Frantzel and Richards
ATTORNEYS

UNITED STATES PATENT OFFICE.

CHARLES MANSHEL, OF NEWARK, NEW JERSEY.

CHECK STAMPING AND ISSUING MACHINE.

1,393,232. Specification of Letters Patent. Patented Oct. 11, 1921.

Application filed March 21, 1919. Serial No. 284,115.

*To all whom it may concern:*

Be it known that I, CHARLES MANSHEL, a citizen of the United States, residing at Newark, in the county of Essex and State of New Jersey, have invented certain new and useful Improvements in Check Stamping and Issuing Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to a ticket or check issuing and stamping machine; and the invention relates, more particularly, to a novel construction of mechanism for stamping and delivering identification checks to passengers upon trolley cars and similar carriers operating under a zone system whereby the rate of fare is determined by the number of zones traversed.

The invention has for its principal object to provide a simple and easily operated mechanism for handling identification checks, whereby an identification check is stamped to indicate the zone in which a passenger boards a car, and is then delivered to the passenger to be held until leaving the car, whereupon the passenger pays the tariff or fare required for passage from the zone in which his journey begins (as indicated by the identification check) to the zone wherein he leaves the car.

Other objects of the present invention, not at this time more particularly enumerated, will be clearly understood from the following detailed description of the same.

With the objects of the present invention in view, the same consists, primarily, in the check stamping and issuing machine, hereinafter set forth; and, the invention consists, furthermore, in the several novel arrangements and combinations of the various devices and parts, as well as in the details of the construction thereof, all of which will be hereinafter more fully described in the following specification, and then finally embodied in the claims appended thereto.

The invention is clearly illustrated in the accompanying drawings, in which:—

Figure 1 is a side elevation of the novel check stamping and issuing machine mounted ready for use, and embodying the principles of my present invention.

Fig. 2 is a side elevation of the novel check stamping and issuing machine drawn on an enlarged scale, one side of the casing being broken away to show the interior mechanism thereof.

Fig. 3 is a detail vertical transverse section taken on line 3—3 in said Fig. 2.

Fig. 4 is a detail side view of the external manually operated means for setting the type-wheel or printing mechanism and the zone indicator operating in conjunction therewith.

Fig. 5 is a detail section taken on line 5—5 in said Fig. 3 to show a detent mechanism for holding said printing mechanism and zone indicator in desired operative position.

Fig. 6 is a detail front elevation of a check shears mechanism, whereby a check, after being properly stamped, is cut off or detached from a strip thereof stored in the machine.

Fig. 7 is a detail cross-section taken on line 7—7 in said Fig. 3, and illustrating the operative movement of the check stamping mechanism.

Fig. 8 is a detail vertical cross-section illustrating the check feeding and delivering mechanism at the completion of its operative movement.

Fig. 9 is a detail plan view of the check guide means and propelling devices for feeding the same.

Fig. 10 is a detail cross-section taken on line 10—10 in said Fig. 3, and illustrating the power and transmission mechanism for operating the several check controlling mechanisms, the same being shown in operated position.

Fig. 11 is a transverse section taken on line 11—11 in said Fig. 10.

Fig. 12 is a face view of a novel form of identification check arranged and constructed for coöperative combination with the check stamping and delivering mechanism.

Similar characters of reference are employed in all of the hereinabove described views, to indicate corresponding parts.

Referring now to said drawings, the reference-character 1 indicates a suitable casing for housing the checks and the stamping and delivery mechanism therefor. The said casing 1 is preferably provided on its rear wall with bayonet hooks 2, which may be detachably engaged in a properly slotted plate 3, fixed in a suitable location in connection with a desired part of the car body 4, for supporting said casing 1. Said casing is further provided with a suitable hinged door 5, normally maintained in secured closed position by means of any desired form of lock or fastening device 6. Said door may be opened to give access to the interior of the casing 1 for the purpose of replenishing the supply of checks stored within the same. The checks are printed in the form shown more particularly in Fig. 12 of the drawings, and are arranged in a continuous strip 7, which strip is doubled back and forth upon itself, so that the body thereof may be compactly arranged for inclosure within the lower interior space 8 of the casing 1. As thus folded, each section of the folded strip contains five checks, and the folded arrangement is such that during the feeding movement of the strip the bulk of the weight of the latter is supported, and only the weight of those sections which are raised from the top of the pile has to be moved by the feeding and delivery mechanism, so that the latter mechanism is subjected to no undue strain.

Provided in the front wall of the casing 1 is a delivery opening 9 through which the checks are ejected. Fixed within said casing so as to extend rearwardly and horizontally from said delivery opening 9 is a check-strip supporting table or guideway 10, the rearward end of which is preferably curved downwardly at 11 to permit the check-strip, as it is pulled up from the space 8, to easily and smoothly ride up over the guideway 10.

The several coöperating mechanisms of the device comprise mainly the following groups; to wit, the printing or stamping mechanism; the check-strip feeding and delivery mechanism; the check shearing or detaching mechanism; all said mechanisms operating in properly timed relation with one another; and lastly, a motor mechanism and transmission for operating the several arrangements above noted.

The printing or stamping mechanism comprises a type-wheel 12 provided on its periphery with type-faces preferably denoting by numeral designations the several zones to be traversed by the car upon which the complete device is used. Said type-wheel 12 is fixed upon a transverse rotary shaft 13 journaled to extend between the side walls of the casing 1, and arranged to locate the type-wheel above the guideway 10 adjacent to the delivery opening 9. One end of said shaft 13 projects exteriorly from one side of said casing 1, and is provided with a knob or finger-piece 14 having a pointer-projection 15. Fixed to the outer side of said casing, behind said knob and its pointer, is an indicator plate 16 having zone indicating numerals thereon with which said pointer-projection may be registered by turning the knob, so that the operator may set the type-wheel 12 for the desired zone by the operation of said knob, which thus turns the shaft 13 whereby the type-wheel is in turn rotated to present the desired zone designation in printing position. In order to hold the type-wheel in desired adjusted position, the shaft 13 is provided with a star-wheel S which is engaged by a spring-pressed pivoted detent pawl P, thereby holding the shaft 13 and the type-wheel 12 thereon against accidental rotary displacement. In order to indicate to both the passenger and the railway employees that the type-wheel is properly set for the zone in which the car is traveling, there is also provided an indicator mechanism, which comprises a housing 17, in which is mounted a rotatable indicator disk 18, bearing on each face thereof zone designating numerals, which are simultaneously disclosed through the openings 19 with which the housing is provided. In order to provide for a synchronous operation of said indicator disk 18 with the type-wheel 12, said shaft 13 is provided with a suitable driving sprocket 20 over which runs a driving chain 21 adapted to drive a sprocket 22 fixed on the journal 23 of said indicator disk 18, consequently if the type-wheel is set to print zone three upon the check-strip the indicator-disk 18 will be simultaneously positioned to disclose through the openings 19 of the housing 17 the numeral designations three, thus indicating to the passenger that the car is traversing zone three. The medium for inking the type-wheel is similar to that employed in the typewriter art. An ink carrying ribbon 24 is arranged to extend over the type face of the type-wheel at its printing point. Said ribbon is in endless form and is passed over an inking-roll 25, the periphery of which is provided with a felt pad or facing 26, which being saturated with ink imparts a renewed supply thereof to the ribbon as it moves over the same. The means for supporting the ribbon comprises a bracket plate 27 from which project carrying pins 28 over which the ribbon runs. Said inking-roll is mounted on a transverse rotary shaft 29 to which successive rotary impulses are transmitted, by means subsequently to be described, whereby the inking-roll is rotated and its rotary motion transmitted to the ribbon to intermittently shift the latter over the type-face of the type-wheel, thus always assuring an adequate supply of ink for the printing operations. The check-strip 7 is fed over the guideway 10 so as to position a zone-check subdivision thereof beneath the type-wheel in printing position. At the proper time the check-strip is automatically raised and pressed against the ink-ribbon covered type-face of the type-wheel, whereby the proper zone designation is printed upon the face of the zone-check subdivision. This operation is effected by a vertically movable stamp-member 30 which rides in a suitable guide-means 31 fixed to the inner side of said casing 1 in proper location. Said stamp-member 30 is provided at its upper end with an inwardly projecting horizontal arm 32 upon which is supported an upwardly projecting platen 33. The guideway 10 is provided with an opening or hatch 34, through which said platen may pass into contact with the check-strip. Connected with the lower end of said stamp-member 30 is a compression spring 35, which exerts an upward pressure upon said stamp-member, so that when the same is released the tension of the spring 35 moves the same vertically upward to carry said platen into printing position, whereby said check-strip is impressed against the ink-ribbon covered type-wheel 12. The means for holding and tripping said stamp-member comprises a transverse rotary shaft 36 upon which is fixed a trip-wheel 37. Secured to said stamp-member 30 is an outwardly projecting roller 38 which rides on the periphery of said trip-wheel. Also secured upon said stamp-member forward of said roller 38 is a stop-projection 39. Formed in the periphery of said trip-wheel are notches 40, so disposed, that one of the same is operatively positioned for coöperation with the roller 38 at each half revolution of said trip-wheel. Normally said trip wheel, in its stopped position, locates one of said notches 40 immediately above said roller 38, while the stop-projection 39 is still engaged with the periphery of the trip-wheel. When a rotary movement is imparted to the trip-wheel 37 a notch 40 is presented in such a way that the stop-projection clears or is freed from the periphery of the trip-wheel, thus freeing or tripping the stamp-member 30 so that the spring 35 may move the same upward. The upward movement of the stamp-member 30 thus occurring not only carries the platen 33 into check-strip impressing relation to the type-wheel, but also permits the roller 38 to drop into the notch 40, (all of which is more particularly illustrated in Fig. 7 of the drawings). The continued rotary movement of the trip-wheel 37 causes the notch 40 to travel on, whereby the roller 38 rides out of said notch and upon the periphery of the trip-wheel, thus returning the stamp-member and platen together with the stop-projection 39 to normal initial lowered position. The trip-wheel is brought to a stop after making a half revolution so that the next notch 40 is registered above the roller 38 while the stop-projection 39 is still engaged with the periphery of the strip-wheel to hold the stamp-member 30 in retracted position, until rotary movement is again transmitted to the trip-wheel 37.

After the printing operation has been accomplished, it is necessary to feed forward the check-strip 7, thereby carrying through the delivery opening 9 the stamped or printed zone-check subdivision thereof, and at the same time positioning the succeeding zone-check subdivision beneath the type-wheel ready for the printing operation. The feeding and delivery mechanism for accompanying the proper movement of the check-strip comprises a rotary cam-member 41, which is fixed upon said transverse shaft 36 for rotation therewith. The periphery of said cam-member 41 is provided with indented portions 42, so positioned that one of the same moves into operative position at each half revolution of the cam-member. Pivotally connected with the sides of said casing 1, so as to be capable of a swinging oscillation, are a pair of lever arms 43, which extend upwardly, one on each side of said guide-way 10. One of said lever arms is provided with a forwardly projecting extension 44 intermediate its ends. Mounted on the free end of said extension 44 is a laterally disposed roller 45 which rides upon the periphery of said cam-member 41. A pull-spring 46 is connected with one of said lever arms for exerting a tension thereon which holds the roller 45 of said extension 44 in continuous riding contact with the periphery of said cam member 41. The upper free ends of said lever-arms 43 are interconnected by means of a rod 47. Pivoted upon said rod 47 are a pair of forwardly and downwardly extending laterally spaced push-fingers or dogs 48 having downwardly extending push lugs 49 adjacent to their free ends. Each zone-check subdivision of the check-strip 7 is provided with a pair of perforations 50, with which said push-lugs 49 engage. The guideway 10 is provided with a pair of laterally spaced longitudinally extending slots 51, alined with the path of movement of said push-fingers or dogs 48 and beneath the perforations 50 in the check-strip 7, so that said push-lugs 49 may ride therein, and thus be permitted to effectively penetrate said perforations 50 of the check-strip, so that a positive engagement of the latter is assured. Normally the said lever arms 43 are in retracted position, being held therein by the engagement of the roller 45 of the extension 44 with the outer circumferential periphery of the cam-member 41.

When in such normal position the lever arms 43 retract the push-fingers 48 so that the push-lugs 49 are caused to drop into a pair of perforations 50 of the check-strip in propelling relation to the latter. A half rotation of the transverse shaft 36, which causes the operation of the printing mechanism, as already above described, also produces a half rotation of the cam-member 41, in such timed relation to the printing operation that subsequent to the completion of the latter operation, an indentation 42 of the cam-member 41 is passed in engagement with the roller 45 thus allowing the lever arms 43 to swing forward under the pull of the spring 46. The forward swing of the lever arms 43 produces a forward movement of the push-fingers 48 thus propelling the check-strips 7 forwardly in the guideway. The propelling movement thus imparted to the check-strip ejects the previously printed or stamped zone-check subdivision through the delivery opening 9, and at the same time positions the next succeeding zone-check subdivision in operative relation to the printing mechanism (as shown more particularly in Fig. 8 of the drawings). The propelling movement being completed, the continued rotary movement of the cam-member 41 causes the roller 45 to ride out of the indentation 42, thus swinging back the lever arms 43 and retracting the push-fingers 48 to normal initial position. During the retractive movement of the push-fingers 48, the push-lugs 49 ride out of the previously engaged perforations 50 of the check-strip, and over the upper surface of the check-strip until normal initial position thereof is regained, whereupon said push-lugs fall into the next succeeding pair of said perforations 50, ready for the next propelling movement.

After the check-strip 7 has been propelled forward, as above described, so that the printed zone-check subdivision has been ejected through the delivery opening 9, it is necessary to cut off or detach the said ejected zone-check subdivision from the main body of the check-strip so that the same may be given to the passenger. The mechanism for doing this consists of the stationary shear-blade 52, which is fixed in the said delivery opening so that the check-strip will pass over the same, and a vertically movable shear-blade 53 mounted on the front of the casing 1 for coöperation with said stationary shear-blade. Fixed on said casing 1 are a pair of vertical guide-members or slideways 54 in and between which the movable shear-blade 53 is mounted for slidable up and down movement therein. Said movable shear-blade 53 is provided at one side with a downwardly extending arm 55 having adjacent to its lower end a laterally projecting arm 56 positioned below the delivery opening 9. Connected with said arm 56 is an inwardly projecting pin 57, which extends through and rides in a slot 58 provided in the front of the casing, so that its free end projects into the interior of the casing 1. A pull-spring 59 attached to said pin 57 exerts an upward pull upon said movable shear-blade 53 to return and hold the same in normal lifted initial position. The means for producing a properly timed cutting stroke of said movable shear-blade 53, comprises a rotary transmission wheel 60 fixed on said transverse shaft 36 to rotate therewith. Projecting outwardly from one face of said transmission wheel 60 are driving pins 61. When said zone-check subdivision has been printed and ejected through the delivery opening 9, the movement of the transmission wheel 60 carries one of said driving pins 61 downwardly upon the pin 57, which is positioned in the path of movement of said driving pin 61. The downward movement of said driving pin 61 depresses said pin 57 thereby transmitting to said movable shear-blade 53 a downward movement adapted to carry the same past the fixed shear-blade 52 so as to shear off the outwardly projecting zone-check subdivision from the main body of the check-strip. As the transmission wheel by continued rotation carries on the driving pin 61 the same is moved out of engagement with said pin 57 so that it is freed to the influence of said pull spring 59, the upward pull of which upon the same returns the movable shear-blade to normal initial position. A suitable cover-shell or hood 62 is secured over the shear-blade mechanism to conceal the same, and guard the same against the interposition of fingers in contact therewith. Said cover-shell or hood 62 is provided with an opening 63 alined opposite said delivery opening 9 through which the ejected zone-check subdivision may pass, a receiving tray 64 being associated with said cover-shell or hood adjacent to said opening 63 in position to receive the served zone-check subdivision so that it may be readily taken up therefrom.

Reverting to the printing mechanism, the means for intermittently shifting the ink ribbon 24 comprises a ratchet wheel 65 fixed on said shaft 29. Pivoted upon said shaft 29 adjacent to said ratchet wheel 65 is an oscillatable arm 66 provided with a pivoted spring pressed pawl 67 which coöperates with the toothed perimeter of said ratchet-wheel. Pivoted to a side of said casing is a trip-lever 68 the upper arm of which has a pin and slot connection with the lower end of said oscillatable arm 66, and the lower end of which extends downwardly to lie in the path of trip-pins 69 which project laterally from one face of said cam-member 41, so that each time the latter makes its rotary movement, one of said trip-pins 69 is carried into and out of engagement with the lower arm of said trip-lever 68, whereby the latter is swung on its fulcrum to transmit a swinging movement to said oscillatable arm 66 to move said pawl 67 in propelling relation to said ratchet-wheel, and consequently imparting a rotary impulse to said shaft 29 and said inking-roll 25 for the purposes already above stated. A pull spring 70 connected with said trip-lever 68 returns the same, and consequently the oscillatable arm 66 and its pawl 67, to normal initial position after the trip-pin passes out of engagement with said trip-lever 68.

In order to impart movement to said transverse shaft 36 to produce successive half revolutions thereof at the will of the operator, the following motor and transmission mechanism is provided. Extending transversely through the interior of said casing, in suitable location, is a fixed non-rotatable shaft 71 upon which is mounted a rotatable driving gear 72, which meshes with a driven gear 73 fixed on said rotary transverse shaft 36, said driving gear having a one to two ratio to said driven gear, so that a quarter revolution of said driving gear will produce a half revolution of said driven gear, the shaft 36, and connected mechanism driven by the later. Secured in fixed relation to one face of said driving gear 72 is a driven disk 74 provided in each quarter of its circumference with a notch 75. Pivoted on said shaft 71 adjacent to said driver disk 74 is a transmission lever 76 one arm of which is provided with a spring pressed pawl or dog 77 which rides on the periphery of said driver disk 74 for coöperation with the notches 75 thereof. The opposite arm of said transmission lever 76 has a catch-nosing 78 formed in connection therewith at its free end. Said transmission lever 76 is provided with a central hub-portion 79 upon the free end of which is secured a collar 80. The reference-character 81 indicates a motor spring which is coiled around said fixed shaft 71. One end of said motor spring is anchored in a fixed collar 82 secured upon said shaft 71, while the opposite end of said motor spring is anchored in said collar 80 fixed to the hub 79 of said transmission lever 76. Pivoted on said hub 79 of said transmission lever 76, between the latter and the collar 80, is a setting-lever 83 which projects normally in upwardly inclined outward extension, its free end projecting exteriorly from the front wall of said casing 1, through a vertical slot 84 provided in the latter therefor. Mounted upon said setting-lever 83 is a slideway housing 85 in which is slidably mounted a spring pressed slide-bolt 86 provided at its forward end with a latch nosing 87 which normally coöperates in engaged relation with said catch-nosing 78 of said transmission lever 76. Said slide-bolt 86 is provided with an outwardly and laterally projecting trigger-pin 88 which extends through a slot 89 provided in said slideway housing 85. Connected in fixed relation to the front wall of said casing so as to project inwardly therefrom to lie in the path of movement of said trigger-pin 88 is a cam-finger 90. A foot-lever 91, normally held in raised position by a pull spring 92, is mounted beneath said casing 1, and is interconnected with the free end of said setting lever by means of a suitable connecting rod or link 93. To operate the motor and transmission mechanism the operator presses down the foot-lever 91 which produces a downward swinging movement of said setting lever 83. Since the latch-nosing 87 of the slide-bolt 86 is normally engaged with the catch-nosing 78 of the transmission lever 76, the downward movement of the setting lever rotates the transmission lever 76 so that its pawl carrying end is moved upward or retracted upon the periphery of the driver disk 74, until just before the completion of the movement said pawl 77 falls into a notch 75. At the same time the rotary movement of the transmission lever 76 winds up the motor-spring 81 to place the same under a powerful stored tension. As the setting-lever 83 approaches the completion of its downward swing, the trigger-pin 88 is carried into engagement with the fixed cam-finger 90, so that a continued movement of the setting-lever presses the trigger-pin 88 against the rearwardly and downwardly curved edge of the cam-finger 90, thus causing the pin to slide rearwardly thereon, and thereby imparting to the slide-bolt 86 a retractive movement which withdraws said latch-nosing 87 from its engaged relation with said catch-nosing of said transmission-lever 76. The transmission-lever 76 is thus freed so that the stored tension of the motor spring 81 may exert its rotating power thereupon to cause a reverse movement of said transmission-lever 76, until halted by engagement with the stop 94, which by reason of the fact of the pawl 77 being engaged in a notch 75 of the driver disk 74, rotates the latter for a quarter turn whereby said driving gear 72 is also rotated a quarter turn, and consequently through the gear 75 a half turn is transmitted to the shaft 36, thereby producing the proper relatively timed operations of printing, delivering and feeding, and shearing the check-strip 7 all as already above described. The operator then releases the foot-lever 91, which is then returned to normal initial position by its spring 92, consequently swinging upwardly to normal initial position again the setting-lever 83. The upward swinging movement of the setting-lever 83 carries the chamfered side of the latch-nosing 87 into engagement with the chamfered side of the catch-nosing 78 of the transmission lever, so that the slide-bolt 86 is pushed back against the tension of its spring, to permit the latch nosing of the same to snap over said catch-nosing of the transmission lever in order to resume its nor-initial engaged relation therewith, thereby rendering the mechanism ready for a repetition of the above described operations when the operator again presses down the foot-lever 91. Of course, it will be understood that the setting-lever may be operated by hand, if desired, rather than by means of the foot-lever and interconnecting link 93.

The check-strip 7 for use with the mechanism comprises a continuous strip previously prepared to provide a series of zone-check subdivisions for successive delivery, and each having adjacent to its ends the openings or perforations 50 for coöperation with the feeding mechanism. Each zone-check subdivision provides an individual identification check having a space —a— in which is printed its serial number, a space —b— adapted to receive the printed designation of a zone produced thereon by the printing operation of the above described novel mechanism, and additional spaces —c— adapted to contain instructions to the passenger as to the use and purpose of the zone-check.

As a passenger enters the car one of the novel zone-checks is issued to him properly printed by the machine to designate the zone in which the passenger began his journey. The zone-check is retained by the passenger, and is surrendered upon his leaving the car, at which time he pays his fare, the amount of which is determined by the number of fare zones he has traversed counting from the zone designated on his zone-check as the point at which his transportation began.

I am aware that some changes may be made in the general arrangements and combinations of the various devices and parts as well as in the details of the construction of the same, without departing from the scope of my invention as set forth in the foregoing specification and as defined in the appended claims. Hence, I do not limit my invention to the exact arrangements and combinations of the devices and parts as described in said specification, nor do I confine myself to the exact details of the construction of the said parts as illustrated in the accompanying drawings.

I claim:

1. A check printing and issuing mechanism comprising a type-wheel, a rotary inking roller, an ink-ribbon running over said inking roller and said type-wheel, means for rotating said inking roller to shift said ink ribbon on said type-wheel, means for supporting a portion of a check-strip beneath said type-wheel, means for impressing a portion of said check-strip in printing relation to said type-wheel, and means for shifting the check-strip to eject the printed portion thereof and position a succeeding portion thereof for the printing operation.

2. A check printing and issuing mechanism comprising a type-wheel, means for setting said type-wheel for producing a desired printed designation, a visible indicator device operating synchronously in conjunction with said type-wheel to disclose a designation corresponding to that for which the type-wheel is set, a rotary inking roller, an ink ribbon running over said inking-roller and said type-wheel, means for rotating said inking roller to shift said ink ribbon on said type-wheel, means for supporting a portion of a check-strip beneath said type-wheel, means for impressing said portion of said check-strip in printing relation to said type-wheel, means for shifting the check-strip to eject the printed portion thereof and position a succeeding portion thereof for the printing operation, and means for severing the ejected printed portion of the check-strip from the main body thereof.

3. In a check printing and issuing mechanism, a casing provided with a delivery opening, a type-wheel mounted within said casing, means for setting said type-wheel, means for inking said type-wheel, a guideway alined with said delivery opening for supporting a portion of a check-strip beneath said type-wheel, a vertically movable stamp-member having a platen-portion alined with said type-wheel, said guideway having an opening permitting said platen-portion to engage said supported portion of said check-strip to carry the same into printing relation to said type-wheel, a transverse shaft rotatably mounted within said casing, a means on and rotated by said shaft for controlling the printing movement of said stamp-member, means for shifting the check-strip to eject the printed portion thereof through said delivery opening, means on and rotated by said shaft for controlling said shifting means, and means for severing the ejected printed portion of said check-strip from the main body thereof.

4. In a check printing and issuing mechanism, a casing provided with a delivery opening, a type-wheel mounted within said casing, means for setting said type-wheel, means for inking said type-wheel, a guideway alined with said delivery opening for supporting a portion of a check-strip beneath said type-wheel, a vertically movable stamp-member having a platen-portion alined with said type-wheel, said guideway having an opening permitting said platen portion to engage said supported portion of said check-strip to carry the same into printing relation to said type-wheel, a transverse shaft rotatably mounted within said casing, a means on and rotated by said shaft for controlling the printing movement of said stamp-member, means for shifting the check-strip to eject the printed portion thereof through said delivery opening, means on and rotated by said shaft for controlling said shifting means, means for severing the ejected printed portion of said check-strip from the main body thereof and means on and rotated by said shaft for controlling said severing means.

5. In a check printing and issuing mechanism, a casing provided with a delivery opening, a type-wheel mounted within said casing, means for setting said type-wheel, means for inking said type-wheel, a guide-way alined with said delivery opening for supporting a portion of a check-strip beneath said type-wheel, a vertically movable spring operated stamp-member having a platen-portion alined with said type-wheel, said guide-way having an opening permitting said platen-portion to engage said supported portion of said check-strip to carry the same into printing relation to said type-wheel, a transverse rotary shaft mounted within said casing, a detent wheel having releasing notches in its periphery mounted on said rotary shaft, a detent stop projection connected with said stamp-member to ride on the periphery of said detent wheel, means for shifting the check-strip to eject the printed portion thereof through said delivery opening, means on and rotated by said rotary shaft for controlling said shifting means, means for severing the ejected portion of said check-strip from the main body thereof, and means on and rotated by said rotary shaft for controlling said severing means.

6. In a check printing and issuing mechanism, a casing provided with a delivery opening, a type-wheel mounted within said casing, means for setting said type-wheel, means for inking said type-wheel, a guide-way alined with said delivery opening for supporting a portion of a check-strip beneath said type-wheel, a vertically movable spring operated stamp-member having a platen-portion alined with said type-wheel, said guideway having an opening permitting said platen-portion to engage said supported portion of said check-strip to carry the same into printing relation to said type-wheel, a transverse rotary shaft mounted within said casing, a detent wheel having releasing notches in its periphery mounted on said rotary shaft, a detent stop projection connected with said stamp-member to ride on the periphery of said detent wheel, a check-strip feeding and delivery means comprising a pair of spring actuated pivoted lever-arms, a pair of push-fingers adapted to engage that portion of the check-strip supported by said guideway, means for pivoting said push-fingers between the free ends of said lever-arms, one of said lever-arms having a forwardly extending portion intermediate its ends provided with a laterally projecting roller, a cam-wheel fixed on said rotary shaft with which said roller engages for controlling the oscillations of said lever-members, means for severing the ejected portion of said check-strip from the main body thereof, and means on and rotated by said rotary shaft for controlling said severing means.

7. In a check printing and issuing mechanism, a casing provided with a delivery opening, a type-wheel mounted within said casing, means for setting said type-wheel, means for inking said type-wheel, a guide-way alined with said delivery opening for supporting a portion of a check-strip beneath said type-wheel, a vertically movable spring operated stamp-member having a platen-portion alined with said type-wheel, said guideway having an opening permitting said platen-portion to engage said supported portion of said check-strip to carry the same into printing relation to said type-wheel, a transverse rotary shaft mounted within said casing, a detent wheel having releasing notches in its periphery mounted on said rotary shaft, a detent stop projection connected with said stamp-member to ride on the periphery of said detent wheel, a check-strip feeding and delivery means comprising a pair of spring actuated pivoted lever-arms, a pair of push-fingers adapted to engage that portion of the check-strip supported by said guideway, means for pivoting said push-fingers between the free ends of said lever-arms, one of said lever-arms having a forwardly extending portion intermediate its ends provided with a laterally projecting roller, a cam-wheel fixed on said rotary shaft with which said roller engages for controlling the oscillations of said lever-members, a stationary shear-blade associated with said delivery opening, a movable shear-blade arranged to coöperate with said stationary shear-blade to sever the ejected portion of said check-strip, spring means for holding said movable shear-blade in normal initial position, a shear-blade operating means on and rotated by said rotary shaft, and means connected with said movable shear-blade adapted to be operatively engaged by said operating means.

8. In a check printing and issuing machine a printing mechanism comprising a type-wheel, means for setting said type-wheel, a rotary inking-roller, a shaft on which said roller is mounted, an endless inking ribbon running over said inking-roller and said type-wheel, means for guiding and supporting said inking ribbon in operative relation to the selected printing face of said type-wheel, means for intermittently rotating said inking roller and its shaft to shift said inking ribbon relative to said type-wheel, means for supporting a check-strip beneath said type-wheel, a vertically movable spring operated stamp-member having a platen-portion, a detent wheel having releasing notches in its periphery, a rotary shaft on which said detent wheel is mounted, and a detent stop projection connected with said stamp-member to ride on the periphery of said detent wheel.

9. In a check printing and issuing machine a printing mechanism comprising a type-wheel, means for setting said type-wheel, a rotary inking roller, a shaft on which said roller is mounted, an endless inking ribbon running over said inking roller and said type-wheel, means for guiding and supporting said inking ribbon in operative relation to the selected printing face of said type-wheel, means for intermittently rotating said inking roller and its shaft to shift said inking ribbon relative to said type-wheel, comprising a ratchet wheel on said shaft, an oscillatable arm fulcrumed on said shaft, said arm having a pawl for coöperation with said ratchet-wheel, and means for oscillating said arm.

10. In a check printing and issuing machine a printing mechanism comprising a type-wheel, means for setting said type-wheel, a rotary inking roller, a shaft on which said roller is mounted, an endless inking ribbon running over said inking roller and said type-wheel, means for guiding and supporting said inking ribbon in operative relation to the selected printing face of said type-wheel, means for supporting a check-strip beneath said type-wheel, a vertically movable spring operated stamp-member having a platen-portion, a detent wheel having releasing notches in its periphery, a rotary shaft on which said detent wheel is mounted, and a detent stop projection connected with said stamp-member to ride on the periphery of said detent wheel.

11. In a check printing and issuing machine a printing mechanism comprising a type-wheel, means for setting said type-wheel, a rotary inking roller, a shaft on which said roller is mounted, an endless inking ribbon running over said inking roller and said type-wheel, means for guiding and supporting said inking ribbon in operative relation to the selected printing face of said type-wheel, means for supporting a check-strip beneath said type-wheel, a vertically movable spring operated stamp-member having a platen-portion, a detent wheel having releasing notches in its periphery, a rotary shaft on which said detent wheel is mounted, a detent stop projection connected with said stamp-member to ride on the periphery of said detent wheel, and means for intermittently rotating said inking roller and its shaft to shift said inking ribbon relative to said type-wheel.

12. In a check printing and issuing machine a printing mechanism comprising a type-wheel, means for setting said type-wheel, a rotary inking roller, a shaft on which said roller is mounted, an endless inking ribbon running over said inking roller and said type-wheel, means for guiding and supporting said inking ribbon in operative relation to the selected printing face of said type-wheel, a check-strip, means for supporting said check-strip beneath said type-wheel, a vertically movable spring operated stamp-member having a platen-portion, a detent wheel having releasing notches in its periphery, a rotary shaft on which said detent wheel is mounted, a detent stop projection connected with said stamp-member to ride on the periphery of said detent wheel, and means for intermittently rotating said inking roller and its shaft to shift said inking ribbon relative to said type-wheel, comprising a ratchet wheel fixed on said inking roller shaft, an oscillatable arm fulcrumed on said shaft adjacent to said ratchet wheel, a pawl on said arm for coöperation with said ratchet-wheel, and means operated by said rotary shaft for oscillating said arm.

13. In a check printing and issuing mechanism, a casing provided with a delivery opening, a type-wheel mounted within said casing, a guideway alined with said delivery opening for supporting a portion of a check-strip beneath said type-wheel, means for impressing said check-strip against said type-wheel, a transverse rotary shaft mounted within said casing, means on said rotary shaft for controlling the operation of said impressing means, means for shifting the the check-strip to eject the printed portion thereof through said delivery opening, and means for severing the ejected portion of said check-strip from the main body thereof.

14. In a check printing and issuing mechanism, a casing provided with a delivery opening, a type-wheel mounted within said casing, a guideway alined with said delivery opening for supporting a portion of a check-strip beneath said type-wheel, means for impressing said check-strip against said type-wheel, a transverse rotary shaft mounted within said casing, means on said rotary shaft for controlling the operation of said impressing means, means for shifting the check-strip to eject the printed portion thereof through said delivery opening, comprising a pair of spring actuated pivoted lever arms, a pair of push-fingers pivoted to said lever arms to engage said check strip, a cam wheel fixed on said rotary shaft, and means connected with said lever arms adapted to be operatively engaged by said cam wheel.

15. In a check printing and issuing mechanism, a casing provided with a delivery opening, a type-wheel mounted within said casing, a guideway alined with said delivery opening for supporting a portion of a check-strip beneath said type-wheel, means for impressing said check-strip against said type-wheel, a transverse rotary shaft mounted within said casing, means on said rotary shaft for controlling the operation of said impressing means, means for shifting the check-strip to eject the printed portion thereof through said delivery opening, comprising a pair of spring actuated pivoted lever arms, a pair of push-fingers pivoted to said lever arms to engage said check-strip, a cam wheel fixed on said rotary shaft, means connected with said lever arms adapted to be operatively engaged by said cam wheel, means for severing the ejected portion of said check-strip, and means on and rotated by said rotary shaft for operating said severing means.

16. In a check printing and issuing mechanism, a casing provided with a delivery opening, a type-wheel mounted within said casing, a guideway alined with said delivery opening for supporting a portion of a check-strip beneath said type-wheel, means for impressing said check-strip against said type-wheel, a transverse rotary shaft mounted within said casing, means on said rotary shaft for controlling the operation of said impressing means, means for shifting the check-strip to eject the printed portion thereof through said delivery opening, comprising a pair of spring actuated pivoted lever arms, a pair of push-fingers pivoted to said lever arms to engage said check-strip, a cam wheel fixed on said rotary shaft, means connected with said lever arms adapted to be operatively engaged by said cam wheel, a stationary shear-blade associated with said delivery opening, a movable shear-blade arranged to coöperate with said stationary shear-blade to sever the ejected portion of said check-strip, spring means for holding said movable shear-blade in normal initial position, a shear-blade operating means on and rotated by said rotary shaft, and means connected with said movable shear-blade adapted to be operatively engaged by said operating means.

17. In a check printing and issuing machine, a casing provided with a delivery opening, a type-wheel mounted within said casing, a guideway alined with said delivery opening for supporting a portion of a check-strip beneath said type-wheel, means for impressing said check-strip against said type-wheel, a transverse rotary shaft mounted within said casing, means on said rotary shaft for controlling the operation of said impressing means, means for shifting said check-strip to eject the printed portion thereof through said delivery opening, means on and rotated by said rotary shaft for controlling said shifting means, a stationary shear-blade associated with said delivery opening, a movable shear-blade arranged to coöperate with said stationary shear-blade to sever the ejected portion of said check-strip, spring means for holding said movable shear-blade in normal initial position, a shear-blade operating means on and rotated by said rotary shaft, and means connected with said movable shear-blade adapted to be operatively engaged by said operating means.

18. In a check printing and issuing machine, means including a driven shaft for operating the printing and issuing mechanism, and means for producing at the will of the operator a rotary movement of said shaft, comprising a transverse fixed shaft, a driving gear mounted to rotate on said fixed shaft, a driver disk having a notched periphery in fixed driving relation to said driving gear, a transmission lever fulcrumed on said fixed shaft, a pivoted dog on one end of said transmission lever for engagement with the notches of said driver-disk, a motor spring around said fixed shaft having one end anchored in fixed position and its opposite end connected with said transmission lever, a pivoted setting lever, a spring pressed slide-bolt on said setting lever, means on the opposite end of said transmission lever normally engaged by said slide-bolt, a trigger-pin connected with said slide-bolt, means coöperating with said trigger-pin for automatically releasing said slide-bolt from engaged relation with said transmission lever when said setting lever completes its setting movement, and a gear on said driven shaft in mesh with said driving gear.

In testimony that I claim the invention set forth above I have hereunto set my hand this 18th day of March, 1919.

CHARLES MANSHEL.

Witnesses:
GEORGE D. RICHARDS,
BARBARA SUTTERLEN.